May 28, 1946.  L. J. HOBBS  2,401,245
COMBINED RECEPTACLE AND SHIELD FOR ATTACHMENT TO BICYCLES
Filed Oct. 21, 1941
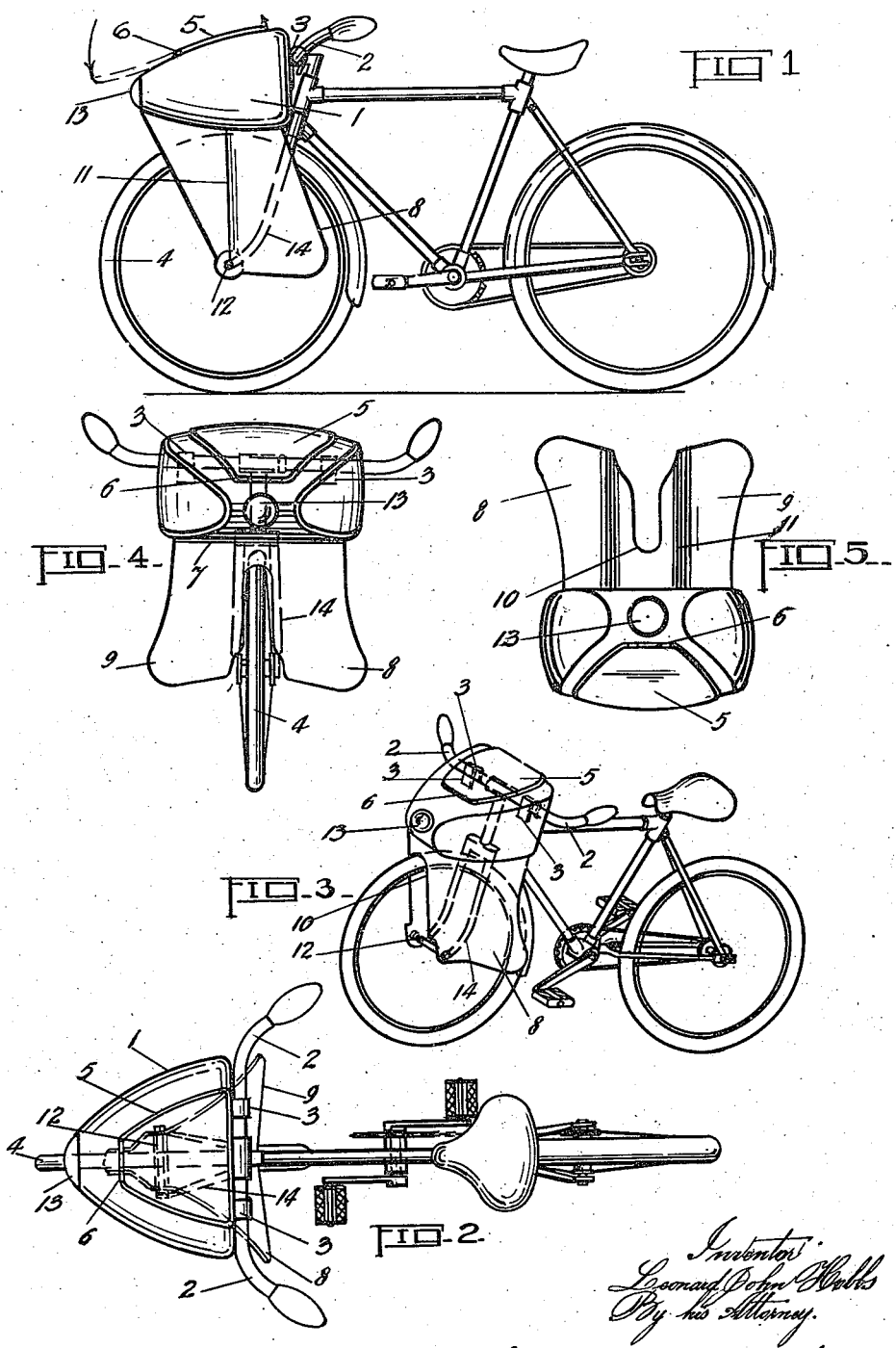

Patented May 28, 1946

2,401,245

UNITED STATES PATENT OFFICE 2,401,245

COMBINED RECEPTACLE AND SHIELD FOR ATTACHMENT TO BICYCLES

Leonard John Hobbs, Annandale, New South Wales, Australia

Application October 21, 1941, Serial No. 415,972

1 Claim. (Cl. 89—36)

The primary object of my invention is to provide an attachment to a bicycle which will function as a shield against weather and possibly against rifle bullets, and which is combined with a receptacle for "first aid" accessories, emergency tools for use in salvaging bombed buildings and the like.

The receptacle, and the shield which is integrally formed, or connected to it, are attached to the bicycle in a manner which permits of rapid removal and replacement. When removed from the bicycle the receptacle and shield may be stood upon the ground to serve as a protection against rifle bullets and to shield a wounded person from the weather while light may be directed upon him from a lamp contained in the receptacle and which under normal conditions serves as a head light the rays passing through a lens at the front of the receptacle.

According hereto a metal receptacle of streamlined contour in plan and side elevation, is attached by spring clips to the handle bar of the bicycle and projects over the front wheel thereof.

Connected to and forming part of the receptacle and co-operative with it as a shield are sheet metal wings which are formed and applied in a manner hereinafter described so that the steering of the bicycle is not interfered with and free movement is permitted for the legs of the rider who is, to considerable extent, protected against wind and rain and possibly from light projectiles coming from the direction in which he is travelling.

An embodiment of my invention is illustrated in the accompanying drawing wherein:

Figure 1 is a side elevation of a bicycle with the invention applied thereto.

Figure 2 is a top plan view of the bicycle.

Figure 3 is a perspective view thereof.

Figure 4 is a front elevation of the bicycle with the attachment applied thereto, and Figure 5 is a view similar to Figure 4 showing the attachment removed from the bicycle.

A metal receptacle 1 of sheet metal, and having welded seams, is of streamlined contour, having somewhat the form of a truncated cone in plan and also in side elevation. The receptacle is attached to the handle bar 2 of the bicycle by spring clips 3 fixed upon its rear wall, and extends over the top of the steering wheel 4.

An opening in the top of the receptacle is closed by a weather tight door 5 which is hinged at 6 and is turnable into the position shown in dotted lines Fig. 1 to serve as a tray.

Connected by bolts or welding to the bottom of the receptacle and upon each side thereof is a flange 7 part of a shield made of relatively thin steel plate and formed to produce two integrally formed wings 8—9 having between them, at their forward ends, an opening 10 through which part of wheel 4 projects as shown in Figs. 3 and 4.

The front of the shield is a little wider than the rim of wheel 4 and flares rearwardly and outwardly from the line 11 (Fig. 1) to clear the steering fork 14 and to form the curved wings 8—9 the lower edges whereof are approximately horizontal while their rear ends may be as wide apart as the width of the receptacle as indicated in Fig. 4.

When the receptacle has been applied by springing the clips 3 over the handle bar 2 the lower front ends of the wings are sprung apart to permit the ends of the elongated axle 12, from which the usual screw nuts have been removed, to be passed through appropriate holes in the wings.

At the front of the receptacle is a lens 13 through which passes the light rays of a lamp contained within the receptacle and employing a dry cell battery or other usual illuminating means.

As shown in Fig. 5 the apparatus when removed from the bicycle may be inverted and stood upon the ground to form a shield for a wounded person or for a rifleman lying behind it and firing through the opening 10 referred to.

I claim:

In an attachment for bicycles, a shield including an imperforate upper receptacle part and spaced wing-like lower parts depending from the upper part, means for detachably securing the shield to a bicycle in a position with the steering wheel of the bicycle accommodated in the space between the wing-like parts, said imperforate receptacle part constituting a base for supporting the shield in an inverted upright position when detached from the bicycle whereby said space may be utilized for aiming and firing a rifle.

LEONARD JOHN HOBBS.